United States Patent Office 3,575,896
Patented Apr. 20, 1971

3,575,896
MICROCELLULAR FOAMS HAVING A LOW GLASS TRANSITION TEMPERATURE
Obaidur Rahman Khan, Center Harbor, N.H., assignor to Davidson Rubber Company, Inc., Dover, N.H.
No Drawing. Continuation-in-part of application Ser. No. 754,114, Aug. 16, 1968. This application June 3, 1969, Ser. No. 830,094
Int. Cl. C08g 22/08, 22/46, 53/08
U.S. Cl. 260—2.5                 4 Claims

ABSTRACT OF THE DISCLOSURE

A microcellular polyurethane foam having an integral skin prepared by reacting:
(1) a prepolymer system having an —NCO content of from 6 to 12 percent made by reacting:
  (A) toluene diisocyanate with
  (B) an organic diol selected from the group consisting of (I) a diol having a molecular weight of about 1000, (II) a diol having a molecular weight of about 2000 and (III) a mixture of a diol having a molecular weight of about 1000 and a diol having a molecular weight of about 2000; and
(2) a catalyst system comprising:
  (C) an organic diol selected from the group consisting of (I) a diol having a molecular weight of about 2000, (II) a mixture of a diol having a molecular weight of about 1000 and a diol having a molecular weight of about 2000, wherein the 1000 molecular weight diol is present in an amount up to about 30 percent by weight of the mixture of 1000 and 2000 molecular weight diols, (III) a mixture of a diol having a molecular weight of about 2000 and 1,4-butane diol and (IV) a mixture of a diol having a molecular weight of about 1000, a diol having a molecular weight of about 2000 and 1,4-butane diol;
  (D) a blowing agent;
  (E) an organo-metallic catalyst;
  (F) an aromatic amine having the formula

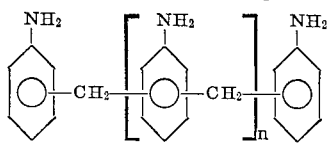

wherein $n$ equals from about 0.1 to about 0.3; and
  (G) a hydroxy compound selected from the group consisting of (III) N,N-di-(2-hydroxypropyl) aniline and (IV) an aromatic diol having the formula

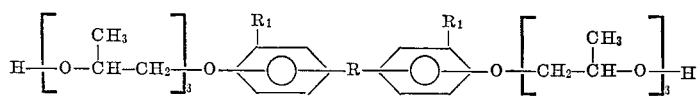

and (V) mixtures of (III) and (IV); the proportions of (A) to (B) to (C) to (F) to (G) being such that:
  (a) the isocyanate index is from about 100 to about 120;
  (b) the —NH$_2$ from aromatic amine to —OH ratio is in the range of from 0.5:1.0 to 1.0:1.0.
  (c) the weight ratio of (G) to the sum of (F) and (G) is in the range of from 0.75:1.0 to 0.95:1.0 when (G) is N,N-di-(2-hydroxypropyl)-aniline and when an aromatic diol is employed as a substitute in total or in part for N,N-di-(2-hydroxylpropyl)-aniline, said aromatic diol is employed in an amount chemically equivalent to the amount of N,N-di-(2-hydroxypropyl)-aniline being replaced.

RELATIONSHIP TO OTHER APPLICATION

This is a continuation-in-part application of co-pending application entitled, "Microcellular Foams Having a Low Glass Transition Temperature," Ser. No. 754,114, filed Aug. 16, 1968, now abandoned.

BACKGROUND OF THE INVENTION

Microcellular foams are characterized by their continuous integral skin which is formed by the urethane itself thus eliminating the application of a separately formed vinyl shell or skin to cover and protect the foamed urethane. The microcellular urethane foams are stronger and tougher than other types of urethane foams, but lighter and less costly per unit volume than solid urethanes. The formation of microcellular foams is complicated and involves a delicate balance of gas formation, chemical and physical changes or polymerization, nucleation and rheology of the polymer system.

The microcellular foams have found a rapidly growing market in the automotive industry where these self-skinning foams are used to produce crash pads, arm rests, bumpers, pillar posts, headrests and the like. The physical properties of the microcellular foams utilized in such applications must meet the high performance and safety standards now demanded by the automotive industry. Therefore, the foams for automotive use must exhibit good tensile strength, elongation, tear strength, and flex modulus characteristics. It is an object of the present invention to produce microcellular foams exhibiting tensile strength, elongation, tear strength, $T_g$ (glass transition temperature) and flex modulus properties acceptable to the automotive industry. Furthermore, the foams produced in accordance with the present invention exhibit good physical properties over a broad range of foam densities, e.g., from about 8 to 60 pounds per cubic foot.

In addition to the physical properties just mentioned, it is important that microcellular foams to be employed in the automotive industry possess thick skins that provide strength and surface protection. The microcellular foams produced by the formulations of the present invention possess thick sturdy skins which give the automotive part added strength and protect the interior foam structure from damage. Furthermore, the skins produced by the formulations of the present invention have no pores and are, therefore, more easily painted than the skins of other microcellular foams.

The research directed to the increased use of microcellular foams in the automotive industry has discovered that high density microcellular foams be used to produce exterior decorative or functional parts. In the production of decorative appliques or functional high density foam bumper components, the foams employed must possess a low glass transition temperature thus retaining their desirable physical properties at the low temperatures often encountered. It is an object of the present invention to produce microcellular foams which possess low glass transition temperatures, usually —40° F. or below.

PRIOR ART

The production of microcellular or soft-skinned foam is not unique; microcellular foam compositions employing 4,4'-methylene bis(2-chloroaniline) (MOCA—E. I. du Pont de Nemours & Co., Inc.) are known. However, the microcellular foam formulations of the present invention produce foams having very low glass transition temperatures than foams of a microcellular nature presently known to the art. Furthermore, the skins produced by the formulations of the present invention are not porous and are, therefore, more easily painted.

DETAILED DESCRIPTION OF THE PRESENT INVENTION

The present invention is directed to urethane formulations and a method for the production of microcellular foams having a low glass transition temperature, i.e., of about −40° F. or below.

These microcellular foams are produced by admixing a prepolymer type system comprising a diol and a toluene diisocyanate with a catalyst type system comprising a 2000 molecular weight diol, an aromatic amine, a hydroxyl compound, organometallic catalyst and a blowing agent with the prepolymer type system and the catalyst type system being admixed at from about 75° to 90° F.

The microcellular foam formulation of the present invention is preferably employed in prepolymer or quasi-prepolymer methods to produce microcellular foams having a density of from 10 to 60 pounds per cubic foot.

The term "aromatic amine" as employed in the present invention designates an amine corresponding to the formula

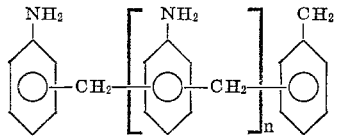

wherein $n$ represents an average value of from about 0.1 to about 0.3 and the aromatic amine has an equivalent weight of from 90 to 105 and a functionality of from about 2.1 to about 2.3. The term "hydroxyl compound" refers to N,N-di(2-hydroxypropyl)aniline or to aromatic diols derived from various bis-phenols and mixtures thereof. The aromatic diols include bis-phenol derivatives such as the bis-phenol derivatives corresponding to the formula

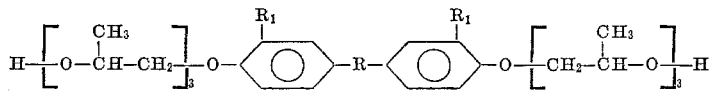

wherein R represents iso-propylidene and sec-butylidene and $R_1$ represents hydrogen, methyl, chloro or phenyl with both $R_1$'s being identical.

The terms "1000 molecular weight diols" and "2000 molecular weight diols" refer to primary and secondary capped diols. The numerical expressions 1000 and 2000 designate the approximate molecular weights of the diol. When processing the foams of the present invention in conventional industrial processing equipment, the use of secondary capped diols is preferred as the secondary capped diols react more slowly than do the primary capped diols making the reaction easier to handle in conventional mass production metering and manufacturing facilities. However, when a very fast reaction is desired or when very high speed metering equipment is available, primary diols can be employed in place of secondary capped diols to produce the foams of the present invention having low glass transition temperatures. The term "diol" refers to dihydroxy polyols produced by reacting an organic epoxide with an organic compound containing two active hydrogens. The active hydrogen compound initiates the epoxide polymerization which is continued until a diol of the desired molecular weight is obtained. Representative organic epoxides include ethylene oxide, propylene oxide and 1,2-butylene oxide. Glycols such as propylene glycol, ethylene glycol, butylene glycol and amine compound having one or two active hydrogen sites constitute representative active hydrogen containing compounds. The toluene diisocyanate employed in the present invention can either be an 80/20 mixture (80 percent 2,4-toluene diisocyanate and 20 percent 2,6-toluene diisocyanate) or the 65/35 mixture or a combination of these mixtures. The 80/20 mixture of isomers gives optimum reaction speed and produces a material having a superior skin.

The diols, aromatic amine, hydroxyl compound and diisocyanate are employed in amounts sufficient to provide an isocyanate index (NCO to all active hydrogen) of from about 100 to about 120. It is generally preferred that the components be combined to produce an isocyanate index of between about 100 and about 110. Formulations having an isocyanate index greater than 110 react so rapidly that they are difficult to handle. The formulations having an isocyanate index in excess of 120 react so rapidly that they gel in the commonly employed mixing devices and the foams produced therefrom can be easily crumpled and are, therefore, unacceptable. When the isocyanate index of the formulation is below 100 the foams produced therefrom do not dry uniformly, blistering occurs during curing and the foams exhibit higher compression sets. Optimum properties of the desired product are obtained when the isocyanate index (NCO to all active hydrogen) is about 105.

In carrying out the method of the present invention a foam having a good balance of properties including low glass transition temperature is ultimately produced by admixing a prepolymer and a catalyst system. The prepolymer is prepared by combining the toluene diisocyanate with a diol to produce a linear polymer having a free NCO content of from 6 to 12 percent. Optimum properties are obtained when the free NCO content of the prepolymer is between about 7.5 to 9.5 percent. Generally a diol having a molecular weight of about 1000 is employed in the production of the linear prepolymer.

In the preparation of the prepolymer, the 1000 molecular weight diol can be replaced in part or in total with 2000 molecular weight polyol. Replacing the 1000 molecular weight diol with 2000 molecular weight diol results in the production of a softer foam with the softness increasing as the proportion of the 2000 molecular weight diol increases. Foams exhibiting a good balance of physical properties are produced when from 0 to about 50 weight percent of the 1000 molecular weight diol is replaced by 2000 molecular weight diol. While more than about 50 percent of the 1000 molecular weight diol can be replaced with 2000 molecular weight diol without deleterious effects on the low glass transition temperature characteristics of the foam, foams wherein the prepolymer contains materially greater than 50 percent of the 2000 molecular weight diol are very soft and have low tensile strength.

In preparing the catalyst system of the present invention the order in which components are combined is not critical; however, it has been found to be convenient to add the aromatic amine, hydroxyl compound and blowing agent to a mixture of the 2000 molecular weight diol and organometallic catalyst. The amount of 2000 molecular weight diol to be employed is conveniently determined with respect to the aromatic amine. It is recommended that from 150 to 450 parts by weight of 2000 molecular weight diol be employed for each 100 parts of aromatic amine. Amounts of diol in excess of 450 parts per 100 parts aromatic amine can be employed; however, in such formulations the amount of hydroxyl compound, N,N-(2-hydroxylpropyl)aniline or aromatic diol must be accordingly decreased to provide the isocyanate index (NCO to all active hydrogen) of from 100 to 120. The use of substantially greater than 450 parts of 2000 molecular weight diol per 100 parts of aromatic amine results in a foam exhibiting increased softness and decreased strength. While it is possible to completely replace the 2000 molecular weight diol in the catalyst system with 1000 molecular weight diol such replacement is not recommended as it results in foams having poor, i.e., higher, glass transition temperatures. Replacement of a small amount, i.e., from 10 to 30 percent by weight, of 2000 molecular weight diol with 1000 molecular weight diol does not, however, appear to alter the glass transition temperature characteristics significantly.

It has been found that the majority of the physical properties of the foam, particularly the Shore-Hardness, can be enhanced by substituting 1,4-butane diol for some of the 2000 molecular weight diol in the catalyst system. The 2000 molecular weight diol serves as a solvent for the aromatic amine and thus it is not convenient to decrease the amount of 2000 molecular weight diol below the amount needed to dissolve the amount of aromatic amine employed. When one of the 2000 molecular weight diol has been replaced with 1000 molecular weight diol, up to about 50 percent by weight of the 2000 molecular weight diol can be replaced with 1,4-butane diol on a weight for weight basis. When a portion of the 2000 molecular weight diol, the amount of 2000 molecular weight diol replaceable with 1,4-butane diol will depend upon having enough 2000 molecular weight diol to serve as solvent for the aromatic amine.

The term "aromatic amine" as employed in the present specification and claims includes mixtures of the various aromatic amines corresponding to the formula previously set forth. The aromatic amine functions as a curing agent and catalyst. The catalytic action of the aromatic amine is sufficient to obviate the necessity for employing a supplemental amine catalyst such as triethylene diamine. The desired properties including low glass transition temperatures are obtained by employing the aromatic amine in quantities sufficient to produce a —NH$_2$ to hydroxyl ratio in the range of from 0.5 to about 1.0 with a ratio of from about 0.7 to about 0.8 being preferred. When the —NH$_2$ to hydroxyl ratio is appreciably greater than 1.0, the reaction proceeds so rapidly that it is difficult to process the foam in existing processing equipment. When the —NH$_2$ to hydroxyl ratio is appreciably less than 0.5, the physical properties of the foam are detrimentally affected.

The N,N-di(2-hydroxypropyl)aniline is employed in an amount sufficient to provide an aromatic amine-N,N-di(2-hydroxypropyl)aniline mixture comprised of from 75 to 95 percent by weight aromatic amine with the corresponding amount, i.e., from about 5 to about 25 percent, being N,N-di(2-hydroxypropyl)aniline. When an aromatic diol derived from bis-phenol is employed as a substitute in total or in part for the N,N-di(2-hydroxypropyl)aniline, the bis-phenol derivative is employed in an amount chemically equivalent to the amount of N,N-di(2-hydroxypropyy)aniline being replaced. Optimum properties are obtained when the aromatic amine-hydroxyl compound mixture is comprised of about 88 percent by weight aromatic amine and about 12 percent by weight N,N-di(2-hydroxypropyl)aniline or an amount of aromatic diol or mixture of N,N-di(2-hydroxypropyl)aniline and aromatic diol chemically equivalent thereto.

The organometallic catalysts employed in the production of urethane foams are suitable for use in the present invention with stannous octoate and lead octoate being preferred. When lead octoate is employed as the organometallic catalyst, it is recommended that the catalyst system be reacted with the prepolymer system within about 24 hours from the time the catalyst system is prepared. If the catalyst system containing the lead octoate is not employed within about 24 hours, the lead appears to form complexes with the other components of the catalyst systems causing the viscosity of the catalyst system to become so great that it is difficult to process in conventional mixing and metering equipment. The stannous octoate does not form similar complexes with the other catalyst system components and is, therefore, the preferred organometallic catalyst. The stannous octoate is employed in an amount equivalent to from about 2 to 6 percent by weight of the total foam composition with about 3.5 percent producing optimum properties. Other suitable organometallic catalysts include dibutyl tin dilaurate, calcium octoate and zinc octoate.

Blowing agents such as the Freon blowing agents are employed in the production of the foams of the present invention. The amount of blowing agent to be employed is dependent upon the density of foam desired. In the formulations producing high density foams the blowing agent generally comprises from about 2 to about 5 percent by weight of the total foam composition. When low density foams are desired the blowing agent is conveniently employed in amounts constituting about 20 percent of foam composition. A small amount of methylene chloride can be employed in addition to any other blowing agent in the production of the high density foams. However, the amount of methylene chloride should not generally be greater than about 50 percent by weight of the total amount of blowing agent as the methylene chloride robs the foam of exothermic heat and may thereby increase the rise time of the foam. If the rise time is increased to a point where it is greater than the gel time, the foam splits and cracks.

The foam formulations of the present invention can also contain other additives such as flame retardants, pigments, reaction inhibitors, water scavengers, fillers and the like. Benzoyl chloride is conveniently used in the prepolymer of the present invention to preserve the prepolymer and inhibit cross-linking; however, benzoyl chloride is not an essential component of the prepolymer of the present invention and prepolymers not containing benzoyl chloride produce foams having the desired physical properties. The use of these or other equivalent additive materials is well known to the skilled in the art.

In the method of the present invention, the prepolymer system is mixed together with the catalyst system or the parts thereof with the reactants at a temperature of from 75° to 90° F. If the temperature is greater than 90° F., the reaction is too fast to be handled in conventional mixing and molding equipment. The two components are mixed together and the mixture added to the mold within a short time after mixing. The urethane composition is added either by injection, strip pouring or other convenient procedure. Due to the speed of the reaction, it is generally necessary to add the foamable urethane mixture to the mold within about 5 seconds after the components are admixed and to have the mold closed and secured within about 30 seconds after the components are admixed. The reaction can be slowed somewhat by the addition of inhibitors or by varying the mixing temperatures.

The foam compositions can be added to any type of mold surface. However, the type of surface employed will affect the type of skin formation obtained. In a preferred procedure an epoxy or silicone rubber mold is employed as these molds do not readily conduct heat and, therefore, contribute to the establishment of a temperature differential between the surface of the mold and the exotherm of the foam. This temperature differential is essential to the production of a thick integral skin on the foamed product. While metal molds can be employed, the metal, being a better conductor of heat than either epoxy or silicone, conducts heat away from the mold surface, and, therefore, does not allow as great a temperature differential to be established. Thus, the use of metal molds often results in the formation of a thin skin on the foamed object.

In the production of foamed objects from the urethane formulations of the present invention, a mold temperature of from 75° to 150° F. is generally employed, with the foaming reaction generally being carried out within the mold for from 4 to 12 minutes. In a convenient procedure, the mold temperature at the time of addition of the urethane formulation is about 90° F. and the material remains in the closed mold for about 8 minutes. It is generally desirable that the skin have a thickness of from about 30 mils to about ⅛ inch; however, the skin thickness desired will depend on the ultimate use of the foamed product. At the lower mold temperatures, care must be taken to eliminate air from being trapped in the mold and at the temperature near 150° F. care must be exercised in order that the skin is not too porous. The foam generally becomes tack-free at the molding temperatures within from about 45 seconds to one minute and the foamed material can be handled without injury thereto as soon as it is removed from the mold. It is not necessary to heat cure the foamed products after they have been removed from the mold; however, if the foamed products are to be painted, it is recommended that they be heat cured to remove gasses from the foam. Failure to heat cure before painting may cause bubbles in the painted surface. In a convenient procedure, the foamed products can be heated at 200° to 225° F. for about one hour.

SPECIFIC EMBODIMENTS

The following examples are merely illustrative and are not deemed to be limiting.

Example 1

In a quasi-prepolymer system the prepolymer is prepared as follows by mixing the following constituents in the order as given.

| Components: | Parts |
|---|---|
| 1000 molecular weight secondary OH capped diol (1) | 46.00 |
| Toluene diisocyanate (80/20 mixture) | 20.20 |
| Benzoyl chloride | 0.10 |

(1)—See note at end of specification.

The catalyst is prepared by mixing together the following components in the order as given.

| Components: | Parts |
|---|---|
| 2000 molecular weight secondary OH capped diol (2) | 29.66 |
| Stannous octoate | 3.00 |
| Aromatic amine (3) | 9.29 |
| N,N-di(2-hydroxypropyl)aniline | 1.26 |
| Freon 11 (5) | 5.00 |
| Methylene chloride | 5.00 |
| Carbon black (20%) dispersed in 1000 molecular weight diol (7) | 1.15 |
| Isocyanate index | 105 |
| NH₂/OH ratio | 0.7 |
| Weight percent aniline in aniline/aromatic amine mixture | 11.9 |

(2), (3), (5), (7)—See notes at end of specification.

The catalyst and prepolymer are mixed together at a temperature of 80° F. and added to a silicone mold at a rate of 300 grams per second. Following the addition of the urethane composition to the mold, the mold is closed and maintained at a temperature of 90° to 100° F. for 10 minutes. Following the foaming period, the foamed material is removed, cured for one hour at 200° F., aged at constant humidity and a temperature of 78° F. for 24 hours thereafter tested for density, tensile strength, tear elongation, compression set, compression deflection and flex modulus. The properties thus measured are set forth in Table 1. A 2" by 4" by ¼" piece of this foam was maintained at −40° F. for 24 hours and then repeatedly bent 180°. The foam did not crack or break down indicating that the glass transition temperature is below −40° F. Impact tests confirmed that the glass transition temperature was below −40° F.

Example 2

Following the method set forth in Example 1, the following quasi-prepolymer system was prepared.

| Components: | Parts |
|---|---|
| Prepolymer— | |
| 1000 molecular weight secondary OH capped diol | 45.00 |
| Toluene diisocyanate (80/20 mixture) | 20.51 |
| Benzoyl chloride | 0.10 |
| Catalyst— | |
| 2000 molecular weight secondary OH capped diol | 31.55 |
| Stannous octoate | 3.50 |
| Aromatic amine | 9.29 |
| N,N-di(2-hydroxypropyl)aniline (4) | 1.26 |
| Freon 11 | 4.00 |
| Carbon black (20%) dispersed in 1000 molecular weight diol (7) | 0.76 |
| Titanium dioxide (50%) dispersed in 1000 molecular weight diol (7) | 3.80 |
| Isocyanate index | 105 |
| NH₂/OH ratio | 0.7 |
| Weight percent aniline in aniline/aromatic amine mixture | 11.9 |

(4), (7)—See notes at end of specification.

The materials were mixed at a temperature of 80° F. and added to a mold at a rate of 300 grams per second. The mold temperature at the time of addition was 90° to 100° F. Following the addition of the urethane composition to the mold, the mold is closed and maintained at the same temperature for 10 minutes. Following the molding period, the product was removed, cured for one hour at 200° F. and the physical properties of the cured material measured and set forth in Table 1. The foam had a glass transition temperature below −40° F.

Example 3

In other examples, the following formulations were hand mixed, molded and tested as described in Example 1. The test results for these various formulations are set forth in Table 1.

| | Formulation in parts by weight | | | |
|---|---|---|---|---|
| | A | B | C | D |
| Catalyst components: | | | | |
| 2,000 molecular weight secondary OH capped diol | 31.55 | 31.55 | 18.90 | 15.0 |
| Aromatic diol (6) | | 3.10 | | |
| 1,4-butane diol | | | | 0.96 |
| N,N-di(2-hydroxypropyl)aniline | 1.26 | 2.52 | | |
| Aromatic amine | 9.29 | 9.29 | 9.29 | 9.3 |
| Lead octoate | 4.00 | 4.00 | 4.00 | |
| Stannous octoate | | | | 3.5 |
| Freon 11 | 10.00 | 10.00 | 10.00 | 6.00 |
| Methylene chloride | | | | 4.0 |
| Carbon black (20%) dispersed in 1,000 molecular weight diol (7) | | | | 1.2 |
| Prepolymer system: | | | | |
| 1,000 molecular weight secondary capped diol | 45.00 | 45.00 | 45.00 | 51.3 |
| Isocyanate index | 105 | 105 | 105 | 105 |
| NH₂/OH ratio | 0.7 | 0.7 | 0.7 | 0.7 |
| Weight percent aniline in aniline/aromatic amine mixture | 25 | 11.9 | 21.2 | 8.3 |
| Toluene diisocyanate '80/20) | 20.10 | 20.10 | 20.10 | 20.20 |
| Benzoyl chloride | 0.10 | 0.10 | 0.10 | 0.10 |

(6), (7)—See notes at end of specification.

In further operations, foams having properties similar to the foams described in this example are prepared using prepolymer systems composed of 1000 molecular weight diol (45 parts) and toluene diisocyanate (20.1 parts).

Example 4

A low density foam system was produced employing the following formulations.

| | Formulations in parts by weight | |
|---|---|---|
| | A | B |
| Prepolymer system: | | |
| 1,000 molecular weight secondary OH capped diol | 45.00 | 45.00 |
| Toluene diisocyanate | 20.10 | 20.10 |
| Benzoyl chloride | 0.10 | 0.10 |
| Catalyst systems: | | |
| 2,000 molecular weight secondary OH capped diol | 26.70 | 31.55 |
| N,N-di(2-hydroxypropyl)aniline | 1.73 | 1.26 |
| Aromatic amine | 9.29 | 9.29 |
| Stannous octoate | 3.00 | 3.00 |
| Freon 11 | 20.00 | 20.00 |
| Isocyanate index | 105 | 105 |
| NH$_2$/OH ratio | 0.7 | 0.7 |
| Weight percent aniline in aniline/aromatic amine mixture | 15.7 | 11.9 |

The prepolymer and catalyst systems were mixed at 80° F. and poured into an aluminum or nickel mold heated to from 100° to 110° F. The mold was closed and maintained at a temperature of from 100° to 110° F. for 10 minutes. Following the heating period the product is removed from the mold, cured at room temperature for 24 hours and the properties tested. The properties are listed in Table 1.

Example 5

Medium density foams suitable for use in steering wheels were produced in accordance with the method set forth in Example 4 from the following formulation:

| | Parts by weight | |
|---|---|---|
| | A | B |
| Prepolymer system: | | |
| 1,000 molecular weight secondary OH capped diol | 46.00 | 45.00 |
| Toluene diisocyanate (80/20) | 20.20 | 20.10 |
| Benzoyl chloride | 0.10 | 0.10 |
| Catalyst system: | | |
| 2,000 molecular weight secondary OH capped diol | 29.66 | 26.75 |
| N,N-di(2-hydroxypropyl)aniline | 1.26 | 1.73 |
| Aromatic amine | 9.29 | 9.29 |
| Stannous octoate | 3.00 | 3.00 |
| Freon 11 | 12.00 | 15.00 |
| Methylene chloride | 5.00 | |
| Isocyanate index | 105 | 105 |
| NH$_2$/OH ratio | 0.7 | 0.7 |
| Weight percent aniline in aniline/aromatic amine mixture | 11.9 | 15.7 |

The following commercially available materials were employed in the formulations of the present invention. It is understood that other materials falling within the definitions set forth in the present specification and claims can be and have been substituted for the listed commercial products. Such substitutions of equivalents does not depart from the present invention.

NOTES (1) P-1010 (Wyandotte Chemicals Corporation) poly(oxypropylene)glycol.

(2) P-2010 (Wyandotte Chemicals Corporation) poly(oxypropylene)glycol.

(3) Curithane 103 (equivalent weight 103, functionality 2,3)-Upjohn Co., Polymer Chemicals Division. This can be replaced with Curithane 90 (a mixture of aromatic amines as herein defined having equivalent weights of 103 and 93 wherein the functionality of the mixture is about 2.2) in accordance with the teachings of the present invention.

(4) Isonol C-100 (Upjohn Co., Polymer Chemicals Division).

(5) Trichlorofluoromethane (E. I. du Pont de Nemours & Co., Inc.).

(6) Puracol 245 (Wyandotte Chemicals Corporation).

(7) The 1000 molecular weight diol is poly(oxypropylene)glycol P-1010 (Wyandotte Chemicals Corporation) as employed in the prepolymer. The amount of 1000 molecular weight glycol used to disperse the pigment is included in the calculations of the isocyanate to active hydrogen ratios and to the aromatic amine —NH$_2$ to —OH ratio.

TABLE 1

| Material prepared in Example No.— | Density (pounds/ft.$^3$) | Tensile strength (p.s.i.) | Tear strength (pounds/inch) | Elongation (percent) | Percent compression set [1] | Compression deflection (50% p.s.i.) | Modulus flex (p.s.i.) |
|---|---|---|---|---|---|---|---|
| 1 | 48 | 1,140 | 210 | 300 | 46 | 975 | 1,330 |
| 2 | 57 | 1,000 | 244 | 250 | 48 | 960 | 1,325 |
| 3A | 53 | 739 | 199 | 200 | 53 | 776 | 1,135 |
| 3B | 52 | 765 | 187 | 190 | 53 | 792 | 1,545 |
| 3C | 55 | 922 | 261 | 255 | 84 | 1,103 | 1,863 |
| 3D | 55.4 | 1,034 | 285 | 225 | 34.7 | 1,630 | 2,410 |
| 4A | [2] 6.85 | 32.7 | 4.0 | 253 | 64.1 | [3] 1.4 | |
| 4B | [2] 6.45 | 23.3 | 3.4 | 160 | 22.1 | [3] 1.32 | |
| 5A | 27 | 317 | 97 | 250 | 42 | 256 | 704 |
| 5B | 28 | 311 | 100 | 200 | 68 | 505 | 760 |

[1] ASTM Test D-1564-58, Method B—Results expressed as percent of the original height of the sample which did not recover in 30 minutes after sample had been compressed to ½ original height for a period of 22 hours at 158° F.

[2] Core density (within skin)—Overall density (with skin) is from 10 to 15 lbs./ft.$^3$

[3] 25% deflect.

What is claimed is:

1. A microcelluar polyurethane foam having an integral skin prepared by reacting:
   (1) a prepolymer system having an —NCO content of from 6 to 12 percent made by reacting
      (A) toluene diisocyanate with
      (B) an organic diol selected from the group consisting of (I) a diol having a molecular weight of about 1000, (II) a diol having a molecular weight of about 2000 and (III) a mixture of a diol having a molecular weight of about 1000 and a diol having a molecular weight of about 2000; and
   (2) a catalyst system comprising:
      (C) an organic diol selected from the group consisting of (I) a diol having a molecular weight of about 2000, (II) a mixture of a diol having a molecular weight of about 1000 and a diol having a molecular weight of about 2000, wherein the 1000 molecular weight diol is present in an amount up to about 30 percent by weight of the mixture of 1000 and 2000 molecular weight diols, (III) a mixture of a diol having a molecular weight of about 2000 and 1,4-butane diol and (IV) a mixture of a diol having a molecular weight of about 1000, a diol having a molecular weight of about 2000 and 1,4-butane diol;
      (D) a blowing agent;
      (E) an organo-metallic catalyst;
      (F) an aromatic amine having the formula

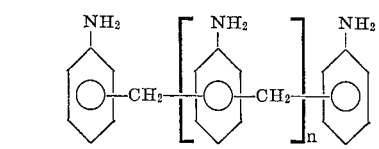

wherein $n$ equals from about 0.1 to about 0.3; and (G) a hydroxy compound selected from the group consisting of (III) N,N-di-(2-hydroxypropyl)-aniline and (IV) an aromatic diol having the formula

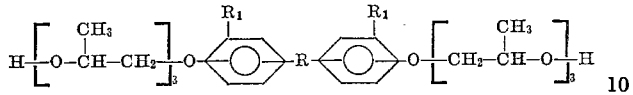

and (V) mixtures of (III) and (IV); the proportions of (A) to (B) to (C) to (F) to (G) being such that:

(a) the isocyanate index is from about 100 to about 120;

(b) The —$NH_2$ from aromatic amine to —OH ratio is in the range of from 0.5:1.0 to 1.0:1.0.

(c) the weight ratio of (G) to the sum of (F) and (G) is in the range of from 0.75:1.0 to 0.95:1.0 when (G) is N,N-di-(2-hydroxypropyl)-aniline and when an aromatic diol is employed as a substitute in total or in part for N,N-di-(2-hydroxylpropyl)-aniline, said aromatic diol is employed in an amount chemically equivalent to the amount of N,N-di-(2-hydroxypropyl)-aniline being replaced.

2. The microcellular urethane foam claimed in claim 1 wherein at least 70 percent of the organic diol has a molecular weight of about 2000.

3. The microcellular urethane foam claimed in claim 1 wherein the hydroxy compound is N,N-di(2-hydroxypropyl)-aniline.

4. The microcellular urethane foam claimed in claim 1 wherein the aromatic amine corresponds to the formula

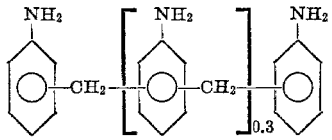

References Cited

UNITED STATES PATENTS

| 3,194,793 | 7/1965 | Kogon | 260—77.5 |
| 3,450,653 | 6/1969 | McClellan | 260—18 |
| 3,355,535 | 11/1967 | Hain et al. | 264—321 |

FOREIGN PATENTS

| 1,438,004 | 3/1966 | France | 260—2.5 |
| 1,448,751 | 7/1966 | France | 260—2.5 |
| 87,977 | 10/1966 | France | 260—2.5 |

OTHER REFERENCES

Dutch patent specification publication 6509819, 11 pages (1965).

Dutch patent specification publication 6509855, 8 pages (1965).

J. K. Stille: Introduction to Polymer Chemistry, pages 30–32 (1962).

DONALD E. CZAJA, Primary Examiner

H. J. COCKERAM, Assistant Examiner

U.S. Cl. X.R.

260—18, 77.5; 264—48, 54

UNITED STATES PATENT OFFICE
CERTIFICATE OF CORRECTION

Patent No. 3,575,896    Dated April 20, 1971

Inventor(s)  Obaidur Rahman Khan

It is certified that error appears in the above-identified patent and that said Letters Patent are hereby corrected as shown below:

Column 3, lines 33 to 39, that portion of the formula reading

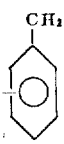    should read    

Column line 25, "one" should be --none--. Column 5, line 30, after "diol," insert --is replaced with 1000 molecular weight diol--. Column 5, line 62, "N,N-di(2-hydroxypropyy)" should be --N,N-di(2-hydroxypropyl)--. Column 8, line 68, "'80/20 should be --(80/20)--. Column 9, line 39, the numeral after "to" (second occurence) should be --110°--. Column 10, line "2,3" should be --2.3--.

Signed and sealed this 27th day of March 1973.

(SEAL)
Attest:

EDWARD M. FLETCHER, JR.          ROBERT GOTTSCHALK
Attesting Officer                 Commissioner of Paten